United States Patent
Kim et al.

(10) Patent No.: US 9,450,241 B2
(45) Date of Patent: Sep. 20, 2016

(54) COMPOSITE CATHODE ACTIVE MATERIAL, AND CATHODE AND LITHIUM BATTERY INCLUDING THE MATERIAL

(71) Applicant: Samsung SDI Co., Ltd., Gyeonggi-do (KR)

(72) Inventors: Ji-Hyun Kim, Yongin-si (KR); Yong-Chan You, Yongin-si (KR); Chang-Wook Kim, Yongin-si (KR); Jun-Seok Park, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 339 days.

(21) Appl. No.: 13/795,051

(22) Filed: Mar. 12, 2013

(65) Prior Publication Data
US 2014/0054493 A1 Feb. 27, 2014

(30) Foreign Application Priority Data
Aug. 23, 2012 (KR) ........................ 10-2012-0092537

(51) Int. Cl.
*H01M 4/505* (2010.01)
*C01G 45/12* (2006.01)
*C01G 53/00* (2006.01)

(52) U.S. Cl.
CPC ............ *H01M 4/505* (2013.01); *C01G 45/125* (2013.01); *C01G 53/50* (2013.01); *Y02E 60/122* (2013.01)

(58) Field of Classification Search
None
See application file for complete search history.

(56) References Cited

U.S. PATENT DOCUMENTS

| 7,135,252 | B2 | 11/2006 | Thackeray et al. |
| 7,964,309 | B2 | 6/2011 | Kuwahara et al. |
| 2007/0202405 | A1 | 8/2007 | Shizuka et al. |
| 2008/0070122 | A1* | 3/2008 | Park et al. .................... 429/330 |
| 2008/0145760 | A1 | 6/2008 | Yoon et al. |
| 2010/0086853 | A1* | 4/2010 | Venkatachalam et al. ... 429/223 |

FOREIGN PATENT DOCUMENTS

| JP | 2005-340186 | 12/2005 |
| JP | 2011-171150 A | 9/2011 |
| KR | 10-2008-0026316 | 3/2008 |
| KR | 10-2008-0054708 | 6/2008 |
| KR | 10-2008-0096371 | 10/2008 |
| KR | 10-2011-0084200 | 7/2011 |

* cited by examiner

*Primary Examiner* — Necholus Ogden, Jr.
(74) *Attorney, Agent, or Firm* — Lee & Morse, P.C.

(57) ABSTRACT

A composite cathode active material represented by the formula $(1-x)LiM1_aM2_bM3_cO_2-xLi_2M4O_3$, wherein M1, M2, and M3 are each independently selected from the group of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B); M4 is selected from the group consisting of manganese (Mn), titanium (Ti0, and zirconium (Zr); M1, M2, and M3 are different from one another; and $0.5<x<1$, $0<a<1$, $0<b<1$, $0<c<1$, $a+b+c=1$, and $0<[(1-x)\times a]/[(1-x)\times c+x]\leq 0.14$.

20 Claims, 2 Drawing Sheets

COMPOSITE CATHODE ACTIVE MATERIAL, AND CATHODE AND LITHIUM BATTERY INCLUDING THE MATERIAL

CROSS-REFERENCE TO RELATED APPLICATION

The present application claims priority under 35 U.S.C. §119 to Korean Patent Application No. 10-2012-0092537, filed on Aug. 23, 2012, in the Korean Intellectual Property Office, and entitled: "Composite Cathode Active Material and Cathode and Lithium Battery Including the Material," which is incorporated by reference herein in its entirety.

BACKGROUND

1. Field

One or more embodiments relate to a composite cathode active material, and a cathode and a lithium battery each including the composite cathode active material.

2. Description of the Related Art

Lithium batteries have a high voltage and a high energy density, and thus are used in various applications. Devices such as electric vehicles (HEV, PHEV), and the like should be operable at high temperatures, be able to charge or discharge a large amount of electricity, and have long-term usability. Thus, high-capacity lithium batteries are desirable. Characteristics of lithium batteries depend on characteristics of an anode, an electrolyte, and a separator used therein, and in particular, may depend on electrochemical characteristics of a cathode active material thereof.

SUMMARY

Embodiments are directed to a composite cathode active material represented by Formula 1 below:

$$(1-x)\text{LiM1}_a\text{M2}_b\text{M3}_c\text{O}_2 - x\text{Li}_2\text{M4O}_3 \quad \text{<Formula 1>}$$

wherein, in Formula 1, M1, M2, and M3 are each independently selected from the group of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B); M4 is selected from the group of manganese (Mn), titanium (Ti), and zirconium (Zr); M1, M2 and M3 are different from one another; and $0.5 < x < 1$, $0 < a < 1$, $0 < b < 1$, $0 < c < 1$, $a+b+c=1$, and $0 < [(1-x) \times a]/[(1-x) \times c + x] \leq 0.14$.

In an implementation, $0.5 < x \leq 0.875$.

The compound represented by Formula 1 may be a compound represented by Formula 2 below:

$$(1-x)\text{LiM1}_a\text{M2}_b\text{M3}_c\text{O}_2 - x\text{Li}_2\text{MnO}_3 \quad \text{<Formula 2>}$$

wherein, in Formula 2, M1, M2, and M3 are each independently selected from the group of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B); and $0.5 < x < 1$, $0 < a < 1$, $0 < b < 1$, $0 < c < 1$, $a+b+c=1$, and $0 < [(1-x) \times a]/[(1-x) \times c + x] \leq 0.14$.

In an implementation, $0.5 < x \leq 0.875$.

The compound represented by Formula 1 may be a compound represented by Formula 3 below:

$$(1-x)\text{LiNi}_a\text{Co}_b\text{Mn}_c\text{O}_2 - x\text{Li}_2\text{MnO}_3 \quad \text{<Formula 3>}$$

wherein, in Formula 3, $0.5 < x < 1$, $0 < a < 1$, $0 < b < 1$, $0 < c < 1$, $a+b+c=1$, and $0 < [(1-x) \times a]/[(1-x) \times c + x] \leq 0.14$.

In an implementation, $0.5 < x \leq 0.875$.

A cathode may include the composite cathode active material. A lithium battery may include the cathode.

Embodiments are also directed to a composite cathode active material represented by Formula 4 below:

$$\text{Li}_{1+z}\text{Ni}_p\text{Co}_q\text{Mn}_r\text{O}_\sigma \quad \text{<Formula 4>}$$

wherein, in Formula 4, $0 < z < 1$, $0 < p < 1$, $0 < q < 1$, $0 < r < 1$, $p+q+r=1$, $0 < p/r \leq 0.14$, and $1.9 \leq \sigma \leq 3.0$.

In an implementation, $0.5 \leq r < 1$. In an implementation, $0.2 < z < 1$.

A cathode may include the composite cathode active material. A lithium battery may include the cathode.

Embodiments are also directed to a composite cathode active material represented by Formula 5 below:

$$\text{Li}_{1+z'}\text{Ni}_{p'}\text{Co}_{q'}\text{Mn}_{r'}\text{O}_2 \quad \text{<Formula 5>}$$

wherein, in Formula 5, $0.2 < z' \leq 1$, $0 < p' < 1$, $0 < q' < 1$, $0 < r' < 1$, $z'+p'+q'+r'=1$, and $0 < p'/r' \leq 0.14$.

In an implementation, $0.5 \leq r' < 1$. In an implementation, $0.2 < z' \leq 0.5$.

A cathode may include the composite cathode active material. A lithium battery may include the cathode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
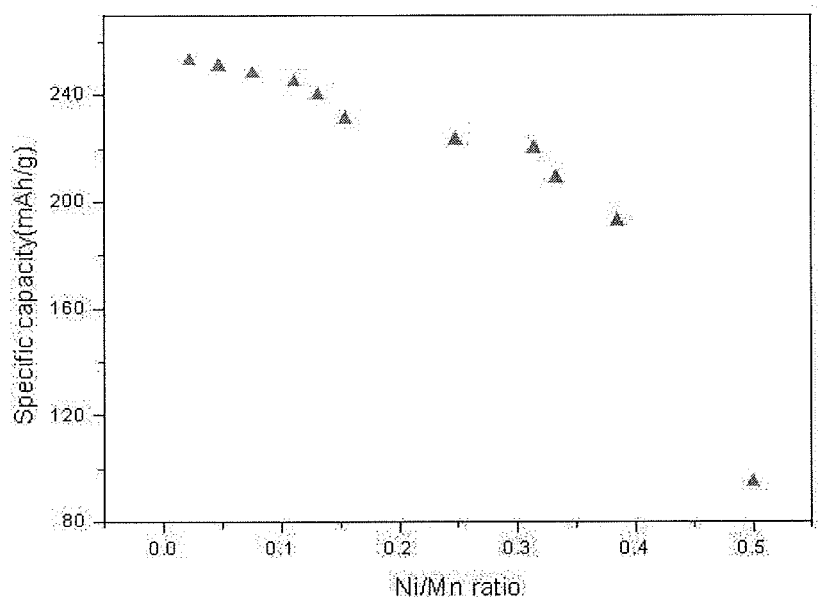
FIG. 1 illustrates a graph showing results of discharge capacity measurements on lithium batteries manufactured in Examples 6 to 10 and Comparative Examples 8 to 14.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration.

Hereinafter, one or more embodiments of a composite cathode active material, a cathode including the composite cathode active material, and a lithium battery including the cathode will be described in greater detail.

One or more embodiments may include a composite cathode active material represented by Formula 1 below:

$$(1-x)\text{LiM1}_a\text{M2}_b\text{M3}_c\text{O}_2 - x\text{Li}_2\text{M4O}_3 \quad \text{<Formula 1>}$$

In Formula 1 above, M1, M2, and M3 may each be independently selected from the group of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B); M4 may be selected from the group of manganese (Mn), titanium (Ti), and zirconium (Zr); M1, M2, and M3 may be different from one another; $0.5 < x < 1$, $0 < a < 1$, $0 < b < 1$, $0 < c < 1$, $a+b+c=1$, and $0 < [(1-x) \times a]/[(1-x) \times c + x] \leq 0.14$.

The composite cathode active material may have improved capacity with a composition ratio of lithium to $O_2$ exceeding 1.2, and a composition ratio of $M1_a/(M3_c+M4)$ ranging from above 0 to 0.14.

When the composition ratio of $M1_a/(M3_c+M4)$ is 0.14 or less, particle diameters of the composite cathode active material may become less dependent on the amounts of lithium, and it may be easier to attain a stable mixture density. When an amount of a lithium precursor added in preparing the cathode active material is within the desired stoichiometric composition ratio, a much reduced particle diameter and a greatly reduced mixture density in the resulting cathode active material may be avoided.

For example, in the composite cathode active material of Formula 1 above, x may satisfy the following relation: $0.5<x\leq0.875$. When x is more than 0.5, the amount of $Li_2M4O_3$ in the composite cathode active material may be sufficient to attain a high discharge capacity.

The composite cathode active material represented by Formula 1 may be a compound represented by Formula 2 below:

$$(1-x)LiM1_aM2_bM3_cO_2-xLi_2MnO_3 \qquad <Formula\ 2>$$

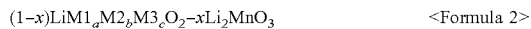

In Formula 2 above, M1, M2, and M3 may each be independently selected from the group of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B); $0.5<x<1$, $0<a<1$, $0<b<1$, $0<c<1$, $a+b+c=1$, and $0<[(1-x)\times a]/[(1-x)\times c+x]\leq0.14$. For example, in the composite cathode active material of Formula 2 above, x may satisfy the following relation: $0.5<x\leq0.875$.

The composite cathode active material represented by Formula 1 may be a compound represented by Formula 3 below:

$$(1-x)LiNi_aCo_bMn_cO_2-xLi_2MnO_3 \qquad <Formula\ 3>$$

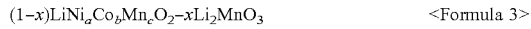

In Formula 3 above, $0.5<x<1$, $0<a<1$, $0<b<1$, $0<c<1$, $a+b+c=1$, and $0<[(1-x)\times a]/[(1-x)\times c+x]\leq0.14$. For example, in the composite cathode active material of Formula 3 above, x may satisfy the following relation: $0.5<x\leq0.875$ may be satisfied.

The composite cathode active material may have an improved capacity with a composition ratio of lithium to $O_2$ exceeding 1.2, and a composition ratio of Ni/Mn ranging from above 0 to 0.14.

One or more embodiments may include a composite cathode active material represented by Formula 4 below:

$$Li_{1+z}Ni_pCo_qMn_rO_\sigma \qquad <Formula\ 4>$$

In Formula 4 above, $0<z<1$, $0<p<1$, $0<q<1$, $0<r<1$, $p+q+r=1$, $0<p/r\leq0.14$, and $1.9\leq\sigma\leq3.0$. In some implementations, r may satisfy the following relation in the composite cathode active material of Formula 4: $0.5\leq r<1$. In some implementations, z may satisfy the following relation in the composite cathode active material of Formula 4: $0.2<z<1$.

One or more embodiments may include a composite cathode active material represented by Formula 5 below:

$$Li_{1+z'}Ni_{p'}Co_{q'}Mn_{r'}O_2 \qquad <Formula\ 5>$$

In Formula 5 above, $0.2<z'\leq1$, $0<p'<1$, $0<q'<1$, $0<r'<1$, $z'+p'+q'+r'=1$, and $0<p'/r'\leq0.14$. In some implementations, r' may satisfy the following relation in the composite cathode active material of Formula 5: $0.5\leq r'<1$. In some implementations, z' may satisfy the following relation in the composite cathode active material of Formula 5: $0.2<z'\leq0.5$.

One or more embodiments include a cathode including the composite cathode active material described above. For example, the cathode may be manufactured by molding a cathode active material composition including the composite cathode active material and a binder into a desired shape, or coating the cathode active material composition on a current collector such as a copper foil, an aluminum foil, or the like.

In particular, the composite cathode active material, a conducting agent, a binder, and a solvent may be mixed to prepare the cathode active material composition. The cathode active material composition may be directly coated onto a metallic current collector to prepare a cathode plate. In some implementations, the cathode active material composition may be cast onto a separate support to form a cathode active material film, which may then be separated from the support and laminated on a metallic current collector to prepare a cathode plate. In some implementations, the cathode may be one of a variety of types.

In some implementations, the cathode may further include, in addition to the above-described composite cathode active material, an additional cathode active material having at least one different characteristic from the above described composite cathode active material in terms of, for example, composition, particle diameter, or the like.

The additional cathode active material may include at least one selected from the group of lithium cobalt oxide, lithium nickel cobalt manganese oxide, lithium nickel cobalt aluminum oxide, lithium iron phosphorous oxide, and lithium manganese oxide.

For example, the additional cathode active material may be a compound represented by one of the following formulae: $Li_aA_{1-b}B_bD_2$ (where $0.90\leq a\leq1.8$, and $0\leq b\leq0.5$); $Li_aE_{1-b}B_bO_{2-c}D_c$ (where $0.90\leq a\leq1.8$, $0\leq b\leq0.5$, and $0\leq c\leq0.05$); $LiE_{2-b}B_bO_{4-c}D_c$ (where $0\leq b\leq0.5$, and $0\leq c\leq0.05$); $Li_aNi_{1-b-c}Co_bB_cD_\alpha$ (where $0.90\leq a\leq1.8$, $0\leq b\leq0.5$, $0\leq c\leq0.05$, and $0<\alpha\leq2$); $Li_aNi_{1-b-c}Co_bB_cO_{2-\alpha}F_\alpha$ (where $0.90\leq a\leq1.8$, $0\leq b\leq0.5$, $0\leq c\leq0.05$, and $0<\alpha<2$); $Li_aNi_{1-b-c}Co_bBcO_{2-\alpha}F_2$ (where $0.90\leq a\leq1.8$, $0\leq b\leq0.5$, $0\leq c\leq0.05$, and $0<\alpha<2$); $Li_aNi_{1-b-c}Mn_bB_cD_\alpha$ (where $0.90\leq a\leq1.8$, $0\leq b\leq0.5$, $0\leq c\leq0.05$, and $0<\alpha\leq2$); $Li_aNi_{1-b-c}Mn_bB_cO_{2-\alpha}F_\alpha$ (where $0.90\leq a\leq1.8$, $0\leq b\leq0.5$, $0\leq c\leq0.05$, and $0<\alpha<2$); $Li_aNi_{1-b-c}Mn_bB_cO_{2-\alpha}F_2$ (where $0.90\leq a\leq1.8$, $0\leq b\leq0.5$, $0\leq c\leq0.05$, and $0<\alpha<2$); $Li_aNi_bE_cG_dO_2$ (where $0.90\leq a\leq1.8$, $0\leq b\leq0.9$, $0\leq c\leq0.5$, and $0.001\leq d\leq0.1$); $Li_aNi_bCo_cMn_dGeO_2$ (where $0.90\leq a\leq1.8$, $0\leq b\leq0.9$, $0\leq c\leq0.5$, $0\leq d\leq0.5$, and $0.001\leq e\leq0.1$); $Li_aNiG_bO_2$ (where $0.90\leq a\leq1.8$, and $0.001\leq b\leq0.1$); $Li_aCoG_bO_2$ (where $0.90\leq a\leq1.8$, and $0.001\leq b\leq0.1$); $Li_aMnG_bO_2$ (where $0.90\leq a\leq1.8$, and $0.001\leq b\leq0.1$); $Li_aMn_2G_bO_4$ (where $0.90\leq a\leq1.8$, and $0.001\leq b\leq0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0\leq f\leq2$); $Li_{(3-f)}Fe_2(PO_4)_3$ (where $0\leq f\leq2$); and $LiFePO_4$.

In the formulae above, A is selected from the group of nickel (Ni), cobalt (Co), manganese (Mn), and combinations thereof; B is selected from the group of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group of oxygen (O), fluorine (F), sulfur (S), phosphorus (P), and combinations thereof; E is selected from the group of cobalt (Co), manganese (Mn), and combinations thereof; F is selected from the group consisting of fluorine (F), sulfur (S), phosphorus (P), and combinations thereof; G is selected from the group of aluminum (Al), chromium (Cr), manganese (Mn), iron (Fe), magnesium (Mg), lanthanum (La), cerium (Ce), strontium (Sr), vanadium (V), and combinations thereof; Q is selected from the group of titanium (Ti), molybdenum (Mo), manganese (Mn), and combinations thereof; I is selected from the group of chromium (Cr), vanadium (V), iron (Fe), scandium (Sc), yttrium (Y), and combinations thereof; and J is selected from the group of vanadium (V), chromium (Cr), manganese (Mn), cobalt (Co), nickel (Ni), copper (Cu), and combinations thereof.

The compounds listed above as additional positive active materials may have a surface coating layer (hereinafter, "coating layer"). In some implementations, a mixture of a compound without a coating layer and a compound having a coating layer, the compounds being selected from the compounds listed above, may be used. The coating layer may include at least one compound of a coating element selected from the group of an oxide, a hydroxide, an oxyhydroxide, an oxycarbonate, and a hydroxycarbonate of the coating element. These compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material when a compound of the coating element is used. For example, the coating layer may be formed using a spray coating method, a dipping method, or the like.

Non-limiting examples of the coating element include $LiNiO_2$, $LiCoO_2$, $LiMn_xO_{2x}(x=1, 2)$, $LiNi_{1-x}Mn_xO_2$ (where $0<x<1$), $LiNi_{1-x-y}Co_xMn_yO_2$ (where $0 \leq x \leq 0.5$ and $0 \leq y \leq 0.5$), $LiFeO_2$, $V_2O_5$, TiS, and MoS.

A suitable material may be used as a conducting agent. For example, the conducting agent may be carbon black or graphite particulates A suitable material may be used as a binding agent. Examples of the binder include a vinylidene fluoride/hexafluoropropylene copolymer, polyvinylidene fluoride (PVDF), polyacrylonitrile, polymethylmethacrylate, polytetrafluoroethylene, mixtures thereof, or a styrene butadiene rubber polymer.

A suitable material may be used as a solvent. Examples of the solvent include N-methyl-pyrrolidone, acetone, or water The amounts of the cathode active material, the conducting agent, the binder, and the solvent used in the manufacture of the lithium battery may be suitable levels that are generally used in the art. At least one of the conducting agent, the binder and the solvent may be omitted according to the use and the structure of the lithium battery.

One or more embodiments include a lithium battery using the cathode including the above-described cathode active material. The lithium battery may be manufactured in the following manner.

First, a cathode may be prepared according to the above-described cathode preparation method.

Next, an anode active material, a conducting agent, a binder, and a solvent may be mixed to prepare an anode active material composition. The anode active material composition may be directly coated onto a metallic current collector and dried to prepare an anode plate. In some implementations, the anode active material composition may be cast onto a separate support to form an anode active material film, which may then be separated from the support and laminated onto a metallic current collector to prepare an anode plate.

The anode active material may be a compound that allows intercalation/deintercalation of lithium. A suitable material available as an anode active material in the art may be used. For example, the anode active material may include at least one selected from the group of lithium metal, a metal that is alloyable with lithium, a transition metal oxide, a non-transition metal oxide, and a carbonaceous material.

Examples of the metal alloyable with lithium include Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof, except that Y is not Si), and a Sn—Y' alloy (where Y' is an alkali metal, an alkali earth metal, a Group XIII element, a Group XIV element, a transition metal, a rare earth element, or a combination thereof, except that Y' is not Sn). As examples, Y or Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Non-limiting examples of the transition metal oxide include a lithium titanium oxide, a vanadium oxide, and a lithium vanadium oxide.

Non-limiting examples of the non-transition metal oxide include $SnO_2$ and $SiO_x$ (where $0<x<2$).

Examples of the carbonaceous material include crystalline carbon, amorphous carbon, and mixtures thereof. Examples of the crystalline carbon include graphite, such as natural graphite or artificial graphite. The graphite may be in an amorphous, plate, flake, spherical or fibrous form. Examples of the amorphous carbon include soft carbon (carbon sintered at low temperatures), hard carbon, mesophase pitch carbides, sintered corks, and the like.

For example, the anode active material may be at least one selected from the group of graphite, Si, Sn, Pb, Ge, Al, $SiO_x$ (where $0<x \leq 2$), $SnO_y$ (where $0<y \leq 2$), $Li_4Ti_5O_{12}$, $TiO_2$, $LiTiO_3$, and $Li_2Ti_3O_7$.

The conducting agent, the binder and the solvent used for the anode active material composition may be the same as those used for the cathode active material composition. In some implementations, a plasticizer may be further added into the cathode active material composition and/or the anode active material composition to form pores in the electrode plates.

The amounts of the anode electrode active material, the conducting agent, the binder, and the solvent may be those levels that are generally used to the manufacture of a lithium battery. At least one of the conducting agent, the binder and the solvent may be omitted according to the use and the structure of the lithium battery.

Next, a separator to be disposed between the cathode and the anode may be prepared. The separator may be any suitable separator that is commonly used for lithium batteries. The separator may have a low resistance to the migration of ions in an electrolyte and may have an excellent electrolyte-retaining ability. Examples of the separator include glass fiber, polyester, Teflon, polyethylene, polypropylene, polytetrafluoroethylene (PTFE), or a combination thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a separator composition. Then, the separator composition may be directly coated onto an electrode, and then dried to form the separator. In some implementations, the separator composition may be cast onto a support and then dried to form a separator film, which may then be separated from the support and laminated onto an electrode to form the separator.

The polymer resin used to manufacture the separator may be any suitable material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate and a mixture thereof.

Next, an electrolyte may be prepared.

For example, the electrolyte may be an organic electrolyte solution. In some implementations, the electrolyte may be in a solid phase. Non-limiting examples of the electrolyte include lithium oxide and lithium oxynitride. Any suitable material available as a solid electrolyte in the art may be used. The solid electrolyte may be formed on the anode by, for example, sputtering.

In some embodiments, an organic electrolyte solution may be prepared as follows. The organic electrolyte solution may be prepared by dissolving a lithium salt in an organic solvent.

The organic solvent may be any suitable solvent available as an organic solvent in the art. Examples of the organic solvent include propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, and mixtures thereof.

The lithium salt may be any suitable material available as a lithium salt in the art. Non-limiting examples of the lithium salt include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a mixture thereof.

Figure 2:
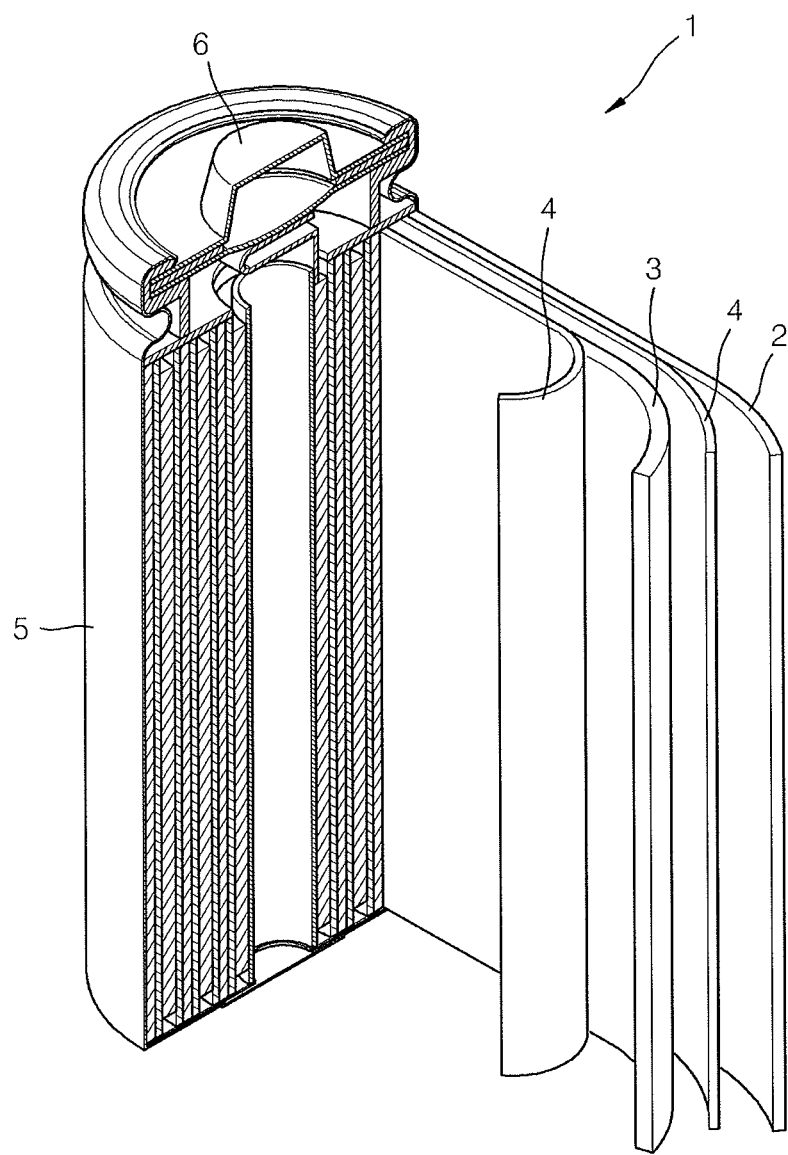
FIG. 2 illustrates a schematic view of a lithium battery according to an embodiment.

Referring to FIG. 2, a lithium battery 1 according to an embodiment includes a cathode 3, an anode 2, and a separator 4. The cathode 3, the anode 2 and the separator 4 may be wound or folded, and then sealed in a battery case 5. Then, the battery case 5 may be filled with an organic electrolyte solution and sealed with a cap assembly 6, thereby completing the manufacture of the lithium battery 1. The battery case 5 may be a cylindrical type, a rectangular type, or a thin-film type. For example, the lithium battery may be a thin-film type battery. The lithium battery may be a lithium ion battery.

The separator may be interposed between the cathode and the anode to form a battery assembly. In some implementations, the battery assembly may be stacked in a bi-cell structure and impregnated with the electrolyte solution. The resultant may be put into a pouch and hermetically sealed, thereby completing the manufacture of a lithium ion polymer battery.

In some implementations, a plurality of battery assemblies may be stacked to form a battery pack, which may be used in any suitable device that operates at high temperatures and requires high output, for example, in a laptop computer, a smart phone, electric vehicle, and the like.

The lithium battery may have high charge/discharge characteristics and improved high-temperature stability, and thus may be appropriate for use in an electric vehicle (EV), for example, in a hybrid vehicle such as plug-in hybrid electric vehicle (PHEV).

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Preparation of Composite Cathode Active Material

EXAMPLE 1

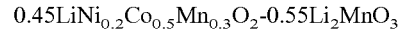

$0.45LiNi_{0.2}Co_{0.5}Mn_{0.3}O_2\text{-}0.55Li_2MnO_3$

As starting materials, lithium carbonate, nickel acetate, cobalt acetate, and manganese acetate were prepared with a proper mole ratio of Li, Ni, Co and Mn for preparing 0.04 mol of a composite cathode active material $0.45LiNi_{0.2}CO_{0.5}Mn_{0.3}O_2\text{-}0.55Li_2MnO_3$. The starting materials were dissolved in 50 ml of a diluted nitric acid solution, followed by an addition of 50 mL of citric acid solution and 30 mL of ethylene glycol. The resulting sol was heated on a hot plate while being stirred to evaporate water. The resulting gel was subjected to a combustion reaction on the hot plate to be completely decomposed, followed by an additional heat treatment. The heat treatment (or calcination) was performed at about 800° C. for about 10 hours in a furnace while supplying dry air. The reaction product was naturally cooled in the furnace to obtain 0.04 mol of the composite cathode active material powder.

The composition of the final composite cathode active material was $Li_{1.55}Ni_{0.09}Cu_{0.225}Mn_{0.685}O_{2.55}$, or more precisely, $0.45LiNi_{0.2}Co_{0.5}Mn_{0.3}O_2\text{-}0.55Li_2MnO_3$. The composition ratio of Ni/Mn was about 0.131.

EXAMPLE 2

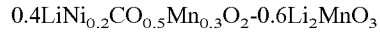

$0.4LiNi_{0.2}CO_{0.5}Mn_{0.3}O_2\text{-}0.6Li_2MnO_3$

A composite cathode active material powder was prepared in the same manner as in Example 1, except that the mole ratio of Li, Ni, Co and Mn was adjusted to obtain 0.04 mol of a composite cathode active material $0.4LiNi_{0.2}Co_{0.5}Mn_{0.3}O_2\text{-}0.6Li_2MnO_3$.

The composition of the final composite cathode active material was $Li_{1.6}Ni_{0.08}CO_{0.2}Mn_{0.72}O_{2.6}$, or more precisely, $0.4LiNi_{0.2}Co_{0.5}Mn_{0.3}O_2\text{-}0.6Li_2MnO_3$. The composition ratio of Ni/Mn was about 0.111.

EXAMPLE 3

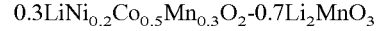

$0.3LiNi_{0.2}Co_{0.5}Mn_{0.3}O_2\text{-}0.7Li_2MnO_3$

A composite cathode active material powder was prepared in the same manner as in Example 1, except that the mole ratio of Li, Ni, Co and Mn was adjusted to obtain 0.04 mol of a composite cathode active material $0.3LiNi_{0.2}CO_{0.5}Mn_{0.3}O_2$-$0.7Li_2MnO_3$.

The composition of the final composite cathode active material was $Li_{1.7}Ni_{0.06}Co_{0.15}Mn_{0.79}O_{2.7}$, or more precisely, $0.30LiNi_{0.2}Co_{0.5}Mn_{0.3}O_2$-$0.70Li_2MnO_3$. The composition ratio of Ni/Mn was about 0.076.

EXAMPLE 4

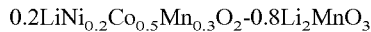
$0.2LiNi_{0.2}Co_{0.5}Mn_{0.3}O_2$-$0.8Li_2MnO_3$

A composite cathode active material powder was prepared in the same manner as in Example 1, except that the mole ratio of Li, Ni, Co and Mn was adjusted to obtain 0.04 mol of a composite cathode active material $0.2LiNi_{0.2}CO_{0.5}Mn_{0.3}O_2$-$0.8Li_2MnO_3$.

The composition of the final composite cathode active material was $Li_{1.8}Ni_{0.04}CO_{0.1}Mn_{0.86}O_{2.8}$, or more precisely, $0.2LiNi_{0.2}CO_{0.5}Mn_{0.3}O_2$-$0.8Li_2MnO_3$. The composition ratio of Ni/Mn was about 0.047.

EXAMPLE 5

$0.1LiNi_{0.2}Co_{0.5}Mn_{0.3}O_2$-$0.9Li_2MnO_3$

A composite cathode active material powder was prepared in the same manner as in Example 1, except that the mole ratio of Li, Ni, Co and Mn was adjusted to obtain 0.04 mol of a composite cathode active material $0.1LiNi_{0.2}CO_{0.5}Mn_{0.3}O_2$-$0.9Li_2MnO_3$.

The composition of the final composite cathode active material was $Li_{1.9}Ni_{0.02}Co_{0.05}Mn_{0.93}O_{2.9}$, or more precisely, $0.1LiNi_{0.2}CO_{0.5}Mn_{0.3}O_2$-$0.9Li_2MnO_3$ The composition ratio of Ni/Mn was about 0.022.

COMPARATIVE EXAMPLE 1

Only $Li_2MnO_3$ powder was used as a cathode active material.

COMPARATIVE EXAMPLE 2

A composite cathode active material powder was prepared in the same manner as in Example 1, except that the mole ratio of Li, Ni, Co and Mn was adjusted to obtain 0.04 mol of a composite cathode active material $0.5LiNi_{0.2}CO_{0.5}Mn_{0.3}O_2$-$0.5Li_2MnO_3$.

The composition of the final composite cathode active material was $Li_{1.5}Ni_{0.1}Co_{0.25}Mn_{0.65}O_{2.5}$, or more precisely, $0.5LiNi_{0.2}CO_{0.5}Mn_{0.3}O_2$-$0.5Li_2MnO_3$ The composition ratio of Ni/Mn was about 0.154.

COMPARATIVE EXAMPLE 3

A composite cathode active material powder was prepared in the same manner as in Example 1, except that the mole ratio of Li, Ni, Co and Mn was adjusted to obtain 0.04 mol of a composite cathode active material $0.5LiNi_{0.33}Co_{0.33}Mn_{0.34}O_2$-$0.5Li_2MnO_3$.

The composition of the final composite cathode active material was $Li_{1.5}Ni_{0.165}Co_{0.165}Mn_{0.67}O_{2.5}$, or more precisely, $0.5LiNi_{0.33}Co_{0.33}Mn_{0.34}O_2$-$0.5Li_2MnO_3$. The composition ratio of Ni/Mn was about 0.246.

COMPARATIVE EXAMPLE 4

A composite cathode active material powder was prepared in the same manner as in Example 1, except that the mole ratio of Li, Ni, Co and Mn was adjusted to obtain 0.04 mol of a composite cathode active material $0.5LiNi_{0.44}Co_{0.16}Mn_{0.4}O_2$-$0.5Li_2MnO_3$.

The composition of the final composite cathode active material was $Li_{1.5}Ni_{0.22}Co_{0.08}Mn_{0.7}O_{2.5}$, or more precisely, $0.5LiNi_{0.44}Co_{0.16}Mn_{0.4}O_2$-$0.5Li_2MnO_3$. The composition ratio of Ni/Mn was about 0.314.

COMPARATIVE EXAMPLE 5

A composite cathode active material powder was prepared in the same manner as in Example 1, except that the mole ratio of Li, Ni, Co and Mn was adjusted to obtain 0.04 mol of a composite cathode active material $0.5LiNi_{0.44}CO_{0.24}Mn_{0.32}O_2$-$0.5Li_2MnO_3$.

The composition of the final composite cathode active material was $Li_{1.5}Ni_{0.22}Co_{0.12}Mn_{0.66}O_{2.5}$, or more precisely, $0.5LiNi_{0.44}Co_{0.24}Mn_{0.32}O_2$-$0.5Li_2MnO_3$. The composition ratio of Ni/Mn was about 0.333.

COMPARATIVE EXAMPLE 6

A composite cathode active material powder was prepared in the same manner as in Example 1, except that the mole ratio of Li, Ni, Co and Mn was adjusted to obtain 0.04 mol of a composite cathode active material $0.5LiNi_{0.5}CO_{0.2}Mn_{0.3}O_2$-$0.5Li_2MnO_3$.

The composition of the final composite cathode active material was $Li_{1.5}Ni_{0.25}Co_{0.1}Mn_{0.65}O_{2.5}$, or more precisely, $0.5LiNi_{0.5}Co_{0.2}Mn_{0.3}O_2$-$0.5Li_2MnO_3$. The composition ratio of Ni/Mn was about 0.385.

COMPARATIVE EXAMPLE 7

A composite cathode active material powder was prepared in the same manner as in Example 1, except that the mole ratio of Li, Ni, Co and Mn was adjusted to obtain 0.04 mol of a composite cathode active material $0.5LiNi_{0.6}Co_{0.2}Mn_{0.2}O_2$-$0.5Li_2MnO_3$.

The composition of the final composite cathode active material was $Li_{1.5}Ni_{0.3}Co_{0.1}Mn_{0.6}O_{2.5}$, or more precisely, $0.5LiNi_{0.6}Co_{0.2}Mn_{0.2}O_2$-$0.5Li_2MnO_3$. The composition ratio of Ni/Mn was about 0.500.

Manufacture of Cathode and Lithium Battery

Example 6

10 g of the composite cathode active material powder of Example 1, 0.43 g of acetylene black powder having an average particle diameter of about 6 μm as a conducting agent, and 0.43 g of polyvinylidene fluoride (PVDF) as a binder were mixed together, followed by an addition of 15 ml of N-methylpyrrolidone (NMP) and stirring the mixture for about 30 minutes to prepare a slurry.

The slurry was coated onto an aluminum (Al) current collector using a doctor blade, to a thickness of about 200 μm. The coated slurry was dried at room temperature, and then dried again under a vacuum at about 110° C., thereby preparing a cathode plate. The cathode plate was pressed into a sheet form using a roll press.

A coin cell (2016 type) of about 16 mm in diameter was manufactured using the cathode plate. In manufacturing the cell, metal lithium as a counter electrode, a polyethylene separator (Star® 20, Asahi) having a thickness of about 20 μm, and an electrolyte solution of 1.15M $LiPF_6$ dissolved in a mixed solvent of ethylenecarbonate (EC), ethylmethylcarbonate (EMC), and diethylcarbonate (DEC) in a 3:3;4 volume ratio, were used.

EXAMPLES 7 TO 10

Cathodes and lithium batteries were manufactured in the same manner as in Example 6, except that the composite cathode active material powders of Examples 2 to 5 were respectively used.

COMPARATIVE EXAMPLE 8

A cathode and a lithium battery were manufactured in the same manner as in Example 6, except that the composite cathode active material powder of Comparative Example 1 was used.

COMPARATIVE EXAMPLES 9 to 14

Cathodes and lithium batteries were manufactured in the same manner as in Example 6, except that the composite cathode active material powders of Comparative Examples 2 to 7 were respectively used.

EVALUATION EXAMPLE 1

Evaluation of Discharge Capacity

The coin cells manufactured according to Examples 6-10 and Comparative Examples 8-14 were each charged with a constant current of 0.1C rate at 25° C. until a voltage thereof reached 4.7V (with respect to Li), and then discharged at a constant current of 0.1C until the voltage reached 2.5V (with respect to Li). The results of the discharge capacity test are shown in FIG. 1 and Table 1.

TABLE 1

| Example | Discharge capacity [mAh/g] |
| --- | --- |
| Example 6 | 240 |
| Example 7 | 245 |
| Example 8 | 248 |
| Example 9 | 251 |
| Example 10 | 253 |
| Comparative Example 8 | 89 |
| Comparative Example 9 | 231 |
| Comparative Example 10 | 223 |
| Comparative Example 11 | 220 |
| Comparative Example 12 | 209 |
| Comparative Example 13 | 193 |
| Comparative Example 14 | 95 |

Referring to Table 1 and FIG. 1, the lithium batteries of Examples 6-10 were found to have higher discharge capacities as compared with those of Comparative Examples 8-14. When the composite cathode active materials had a lithium content and a Ni/Mn ratio each within a particular range according to the Examples 6-10, the lithium batteries had improved discharge capacities.

By way of summation and review, $LiCoO_2$, which is most common among currently commercially available cathode active materials, has a maximum capacity of about 140~150 mAh/g per weight due to its inherent nature. Other high-voltage cathode active materials regarded as promising next-generation materials typically have a maximum capacity of only 180 mAh/g per weight, which is equivalent to 600 mAh/cc per volume.

Therefore, a cathode active material providing an improved capacity, and a lithium battery including the cathode active material having an improved capacity are desirable.

According to the one or more of the above embodiments, using a composite cathode active material including lithium and a transition metal within a predetermined ratio as further described herein, a lithium battery may have improved capacity.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A composite cathode active material represented by Formula 1 below:

$$(1-x)LiM1_aM2_bM3_cO_2-xLi_2M4O_3 \quad \text{<Formula 1>}$$

wherein, in Formula 1, M1, M2, and M3 are each independently selected from the group of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B); M4 is selected from the group of manganese (Mn), titanium (Ti), and zirconium (Zr);

M1, M2 and M3 are different from one another; and
$0.5<x<1$, $0<a<1$, $0<b<1$, $0<c<1$, $a+b+c=1$, and $0<[(1-x)\times a]/[(1-x)\times c+x]\leq 0.14$.

2. The composite cathode active material as claimed in claim 1, wherein $0.5<x\leq 0.875$.

3. The composite cathode active material as claimed in claim 1, wherein the compound represented by Formula 1 is a compound represented by Formula 2 below:

$$(1-x)LiM1_aM2_bM3_cO_2-xLi_2MnO_3 \quad \text{<Formula 2>}$$

wherein, in Formula 2, M1, M2, and M3 are each independently selected from the group of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B); and
$0.5<x<1$, $0<a<1$, $0<b<1$, $0<c<1$, $a+b+c=1$, and $0<[(1-x)\times a]/[(1-x)\times c+x]\leq 0.14$.

4. The composite cathode active material as claimed in claim 3, wherein $0.5<x\leq 0.875$.

5. The composite cathode active material as claimed in claim 1, wherein the compound represented by Formula 1 is a compound represented by Formula 3 below:

$$(1-x)LiNi_aCo_bMn_cO_2-xLi_2MnO_3 \quad \text{<Formula 3>}$$

wherein, in Formula 3, $0.5<x<1$, $0<a<1$, $0<b<1$, $0<c<1$, $a+b+c=1$, and $0<[(1-x)\times a]/[(1-x)\times c+x]\leq 0.14$.

6. The composite cathode active material as claimed in claim 5, wherein $0.5<x\leq 0.875$.

7. A composite cathode active material represented by Formula 4 below:

$$Li_{1+z}Ni_pCo_qMn_rO_\sigma \quad \text{<Formula 4>}$$

wherein, in Formula 4, $0<z<1$, $0<p<1$, $0<q<1$, $0<r<1$, $p+q+r=1$, $0\leq p/r\leq 0.14$, and $1.9\leq \sigma \leq 3.0$.

8. The composite cathode active material as claimed in claim 7, wherein $0.5\leq r<1$.

9. The composite cathode active material as claimed in claim 7, wherein $0.2<z<1$.

10. A composite cathode active material represented by Formula 5 below:

$$Li_{1+z'}Ni_{p'}Co_{q'}Mn_{r'}O_2 \quad \text{<Formula 5>}$$

wherein, in Formula 5, $0.2<z'\leq1$, $0<p'<1$, $0<q'<1$, $0<r'<1$, $z'+p'+q'+r'=1$, and $0<p'/r'\leq0.14$.

11. The composite cathode active material as claimed in claim 10, wherein $0.5\leq r'<1$.

12. The composite cathode active material as claimed in claim 10, wherein $0.2<z'\leq0.5$.

13. A cathode comprising the composite cathode active material of claim 1.

14. A cathode comprising the composite cathode active material of claim 7.

15. A cathode comprising the composite cathode active material of claim 10.

16. A lithium battery comprising the cathode as claimed in claim 13.

17. A lithium battery comprising the cathode as claimed in claim 14.

18. A lithium battery comprising the cathode as claimed in claim 15.

19. The composite cathode active material as claimed in claim 1, wherein:
M1 is Ni;
M3 is Mn: and
$0.022\leq[(1-x)\times a]/[(1-x)\times c+x]\leq0.131$.

20. The composite cathode active material as claimed in claim 19, wherein M2 is Co.

* * * * *